Nov. 10, 1953     R. L. MELTZER ET AL     2,658,798
ELECTRIC DRYING UNIT

Filed Nov. 14, 1951     2 Sheets-Sheet 1

INVENTOR
RUDOLPH L. MELTZER
HENRY E. MELTZER
WILLIAM D. WARNER
BY Young Wright
ATTORNEYS Nov. 10, 1953    R. L. MELTZER ET AL    2,658,798
ELECTRIC DRYING UNIT
Filed Nov. 14, 1951    2 Sheets-Sheet 2
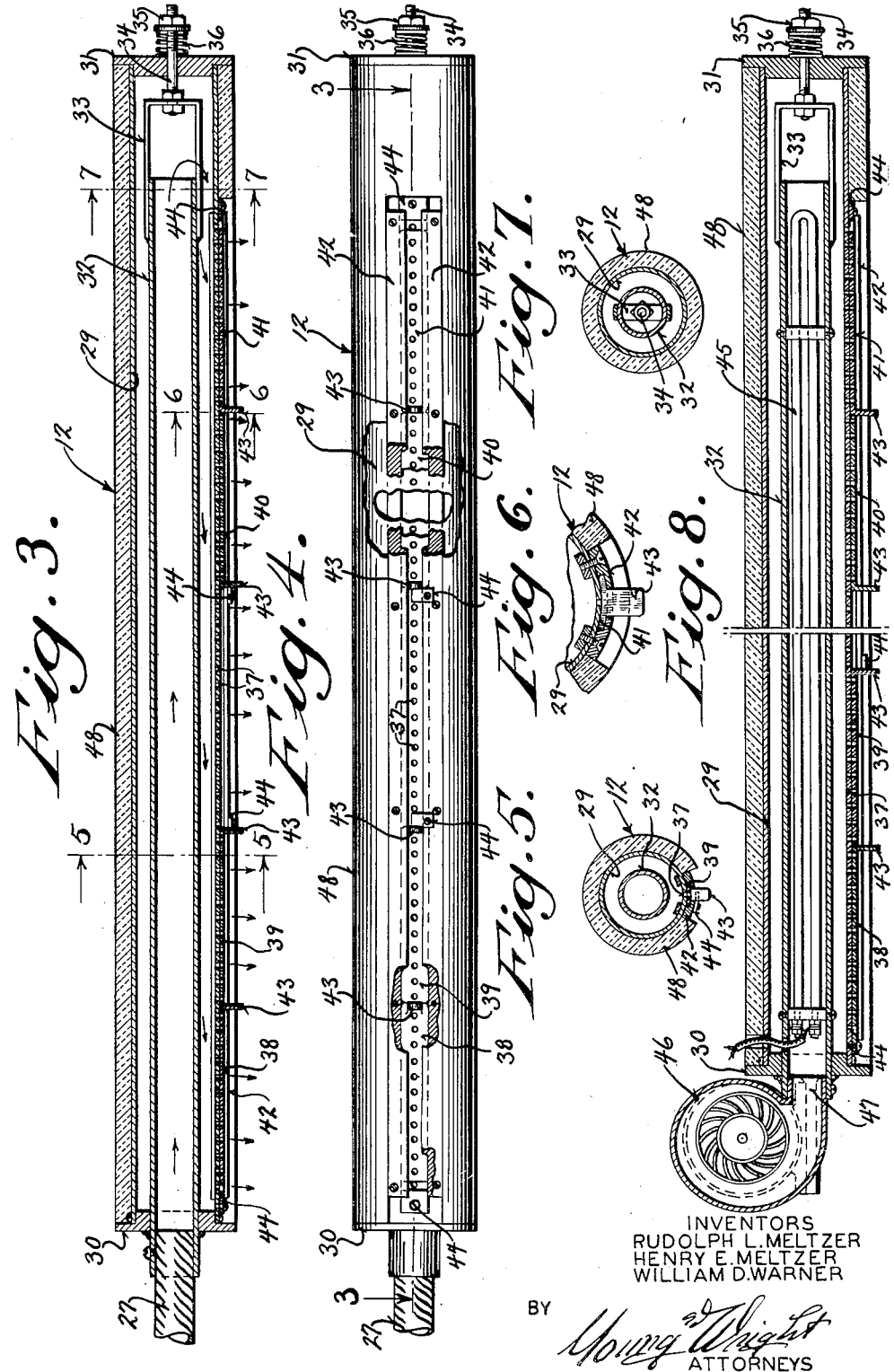
INVENTORS
RUDOLPH L. MELTZER
HENRY E. MELTZER
WILLIAM D. WARNER
BY
ATTORNEYS Patented Nov. 10, 1953

2,658,798

UNITED STATES PATENT OFFICE 2,658,798

ELECTRIC DRYING UNIT

Rudolph L. Meltzer, Henry E. Meltzer, and William D. Warner, Racine, Wis., assignors to Master Appliance Mfg. Co., Racine, Wis.

Application November 14, 1951, Serial No. 256,352

3 Claims. (Cl. 299—106)

This invention appertains to dryers, and more particularly to an air heater and blower for delivering hot air to a desired area of a surface to be dried.

One of the salient objects of our invention is to provide an attachment for presses and other machines for continuously and quickly drying paper and like webs and printer's ink on sheet material, which is of such a construction that the same can be conveniently and easily associated at a desired point with a press or other machine.

Another salient object of our invention is to provide means for localizing or confining a heated blast of air to a desired point or area, whereby to effectively prevent the drying out of bearings on a machine or the over-heating of machine parts and to protect the operator from undue heat.

A further object of the invention is to provide an air heater and blower embodying a hot air distributing cylinder adapted to be placed transversely across a machine at a selected point, the cylinder having a longitudinally extending row of air outlet openings.

Another further object of our invention is the provision of means for heat insulating the cylinder at all points, with the exception of the air outlet openings, means being provided for cutting off the flow of air through certain openings, so that the flow of heated air from the cylinder can be confined to a certain, restricted area.

A further important object of the invention, is the provision of means for introducing the air into the cylinder, so that the heated air will be evenly distributed throughout the length of the cylinder and equally to all of the openings, when all of the openings are being used.

Another further important object of the invention, is the provision of means for heating the air directly in the cylinder should such be desirable for small plants or shops.

A still further important object of the invention is to provide a device of the above character, which will be durable and efficient in use, one that will be simple and easy to manufacture and one which can be placed upon the market and incorporated with a desired machine at a low cost.

With these and other objects in view, the invention consists in the novel construction, arrangement and formation of parts, as will be more specifically described and claimed, and illustrated in the accompanying drawings, in which drawings, Figure 1 is a side elevational view of the novel air blower, heater and distributor, parts of the view being shown broken away and in section to illustrate structural detail, parts of the view in section being taken on the line 1—1 of Figure 2, looking in the direction of the arrows.

Figure 3 is a longitudinal sectional view through the hot air distributor, the section being taken on the line 3—3 of Figure 4, looking in the direction of the arrows.

Figure 4 is a bottom plan view of the heat distributor with parts thereof broken away and in section to illustrate structural detail.

Figure 5 is a detail transverse sectional view through the hot air distributor taken on the line 5—5 of Figure 3, looking in the direction of the arrows.

Figure 6 is an enlarged fragmentary detail sectional view through the distributor, taken on the line 6—6 of Figure 3, looking in the direction of the arrows.

Figure 7 is a transverse sectional view through the distributor taken on the line 7—7 of Figure 3, looking in the direction of the arrows.

Figure 8 is a longitudinal sectional view through a modified form of the air blower, heater and distributor, the heater in this form being shown incorporated directly in the air distributor.

Referring to the drawings in detail, wherein similar reference characters designate corresponding parts throughout the several views, the letter A generally indicates the improved dryer, and the same is in the form of an attachment to be connected with a desired machine.

Figure 1:
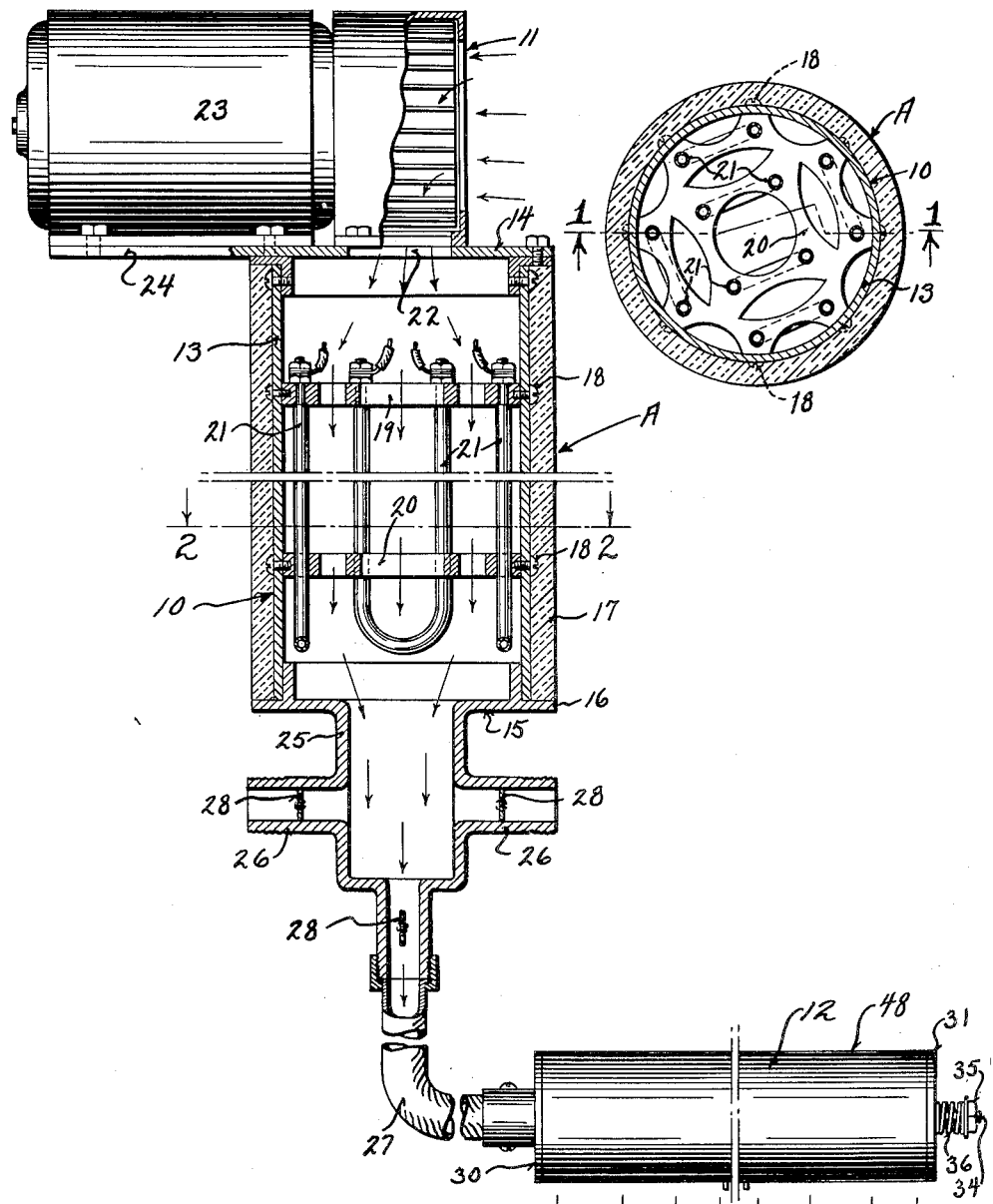
Figure 2:
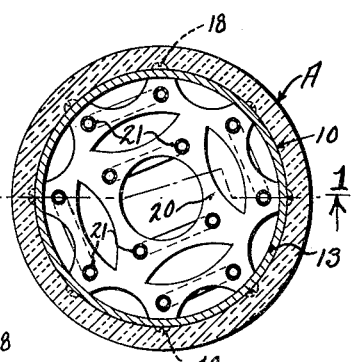
Figure 2 is a horizontal sectional view, taken on the line 2—2 of Figure 1, looking in the direction of the arrows.

The dryer A comprises an air heater 10, through which air is forced by an air blower 11, to a hot air distributor 12.

The heater 10 embodies a shell 13, having connected to its opposite ends heads 14 and 15. Each head is preferably provided with an outstanding marginal flange 16 forming shoulders for supporting a heat insulating jacket 17, which can be formed from asbestos. The jacket completely surrounds the shell 13. Mounted at spaced points within the shell and secured thereto, in any desired way, such as by fastening elements 18, are spaced spiders 19 and 20. The spiders can be of non-electric conducting material, if such should be preferred. The spiders support electric heating elements 21, which can be of the well known "Calrod" type. The heating elements 21 can be rigidly fastened to the upper spider 19, and can be merely guided in the lower spider 20, so that expansion of the heating elements can be taken care of. It is to be understood also, that independent switches can be employed for each heating element, so that one or more of the elements can be cut out according to the temperature of the heat desired.

The header 14 is provided with a large, centrally disposed air inlet 22, communicating with the outlet of the blower 11. The blower 11 can be of the centrifugal type and the blower wheel is operatively connected to the armature shaft of an electric motor 23. The motor can be supported by a bracket 24 bolted, or otherwise secured, to the header 14.

The header 15 has connected therewith a manifold 25 which receives hot air from the heater. This manifold can be provided with any desired number of outlet branches 26, and the branches are connected by means of flexible conduits 27, with the hot air distributors 12. As illustrated in Figure 1, we have only shown one hot air distributor connected with one outlet 26, but obviously, the other outlets 26 can be connected with air distributors for machines. A butterfly valve 28 is arranged in each outlet so that the flow of air therethrough can be controlled. From the description so far, it can be seen that air is taken in by the blower 11 and forced through the shell 10 past the electric heating elements 21, into the manifold 25, and thence to an air distributor, or distributors 12.

Each hot air distributor 12, includes an elongated cylinder 29, the opposite ends of which are closed by end caps 30 and 31. Disposed axially within the cylinder 29 is a hot air conducting tube or pipe 32. This pipe or tube extends through the end cap 30 and terminates slightly short of the end cap 31. The extended end of the tube or pipe 32 has connected thereto a flexible conduit 27. Any means can be employed for rigidly connecting the pipe or tube 32 to the cap 30. The inner end of the tube or pipe has rigidly connected thereto a U-shaped bracket 33, and the bracket in turn has secured thereto a bolt or threaded rod 34, which slidably extends through the cap 31. A nut 35, is threaded on the outer end of the bolt or rod 34, and interposed between the nut and the outer surface of the cap 31 is an expansion coil spring 36. The spring and the bolt provide means for permitting expansion and contraction of the tube or pipe 32 longitudinally.

The cylinder 29 has formed therein a longitudinally extending row of hot air outlet openings 37. These openings are in relatively close relation, so that streams of hot air can be expelled from the cylinder against a desired surface. As previously stated, the cylinder is adapted to be positioned transversely across a desired machine and the row of openings 37 face the web or the printing on the web to be dried.

The hot air enters the pipe 32 at a desired velocity and is expelled into the cylinder toward the cap 31, and is then directed back around the heated pipe and through the row of openings.

As the area of the inlet is greater than the combined area of the row of outlets, a pressure is built up within the cylinder so that an even distribution of air takes place throughout the row of openings from one end to the other.

Means is provided for closing certain of the openings in the row when the heated air is to be delivered to a certain portion of a web only. As illustrated, slide plates 38 and 39, 40 and 41, are provided for this purpose. These plates are slidably mounted in guide tracks 42, bolted, or otherwise rigidly fastened, to the cylinder 29. The slide plates are arranged in pairs on opposite sides of the transverse center of the cylinder so that a central group of the openings in the row 37, will be at all times open. When it is desired to close a series of openings in the row at the ends of the cylinders the slide plate 38 can be moved to the left and the plate 41 moved to the right (see Figure 3). If it is desired to close further groups of openings, then the plates 39 and 40 can be manipulated. Each plate is provided with a manipulating handle 43, and rigid stops 44 secured to one of the guide tracks 42, can be provided for limiting the inward movement of the slide plates 39 and 40.

The form of our invention shown in Figures 1 to 7, inclusive, can be used in a shop employing a number of machines. Where our device is used for a single machine only, the air can be heated directly within the cylinder. This form of our invention is illustrated in Figure 8. As shown in Figure 8, heating elements 45 can be positioned directly within the pipe or tube 32 and these heating elements can also be of the "Calrod" type. Also in this form of our invention, an air blower 46 can have its outlet 47 connected directly with the outer end of the tube or pipe 32. Consequently, as air is blown through the pipe or tube 32, this air is effectively heated by the electric heating elements.

In all forms of our invention, the cylinder 29 is provided with a jacket of heating insulating material 48, so as to confine the heat in the cylinder and to prevent injury to an operator of a machine equipped with our appliances.

Changes in details may be made without departing from the spirit or the scope of this invention, but what is claimed as new is:

1. In a drying unit, a hot air distributor including a longitudinally extending cylinder having at least a row of longitudinally extending openings, end caps closing the terminals of the cylinder, a distributor pipe extending through one of the caps axially into the cylinder and terminating short of the other cap, means for supplying air to the pipe, means securing the pipe to the first-mentioned end cap, a bolt slidably mounted in the other end cap, means connecting the bolt to the pipe, a stop on the outer end of the bolt, and an expansion spring confined between the stop and the adjacent end cap, said spring and bolt permitting lengthwise expansion of said pipe.

2. In a drying unit for use with printing and like machines, a hot air distributor adapted to extend transversely across a machine comprising a cylinder having a longitudinally extending row of outlet openings, said cylinder being imperforate with the exception of said row of outlet openings, caps closing the opposite ends of the cylinder, an imperforate air conducting pipe extending axially into the cylinder and spaced from the inner surface thereof having its opposite ends open, said pipe entering the cylinder through one end cap and terminating short of the opposite end cap for directing air against said opposite end cap, and means for forcing air into the outer end of said pipe.

3. In a drying unit for use with printing and like machines as defined in claim 2, and means for shutting off the flow of air through certain selected groups of outlet openings in the row of openings.

RUDOLPH L. MELTZER.
HENRY E. MELTZER.
WILLIAM D. WARNER.

References Cited in the file of this patent

UNITED STATES PATENTS

| Number | Name | Date |
|---|---|---|
| 265,370 | Barr | Oct. 3, 1882 |
| 1,251,173 | Beregh, Jr. | Dec. 25, 1917 |
| 1,517,434 | Kluever | Dec. 2, 1924 |
| 1,759,804 | Pieron | May 20, 1930 |
| 1,781,608 | Stroble | Nov. 11, 1930 |
| 2,451,926 | Dallin | Oct. 19, 1948 |

FOREIGN PATENTS

| Number | Country | Date |
|---|---|---|
| 323,192 | France | Oct. 31, 1902 |